United States Patent [19]

Nakayama et al.

[11] 3,949,186

[45] Apr. 6, 1976

[54] METHOD FOR WELDING BETWEEN METALLIC BODY AND PRECISION TUBE BODY

[75] Inventors: Masatoki Nakayama; Saburo Shikoh, both of Kisarazu; Hiroshi Nohgata; Yasuo Kimiya, both of Kimitsu; Hiroshi Yada, Munakata; Sin-ichi Nisida, Kitakyushu; Mikio Ogai, Ichihara, all of Japan

[73] Assignees: Nippon Steel Corporation; The Furukawa Electric Co., Ltd., both of Tokyo, Japan

[22] Filed: Sept. 27, 1974

[21] Appl. No.: 510,028

[30] Foreign Application Priority Data

Sept. 28, 1973 Japan.............................. 48-109073

[52] U.S. Cl. 219/121 EM; 219/121 LM; 219/121 P
[51] Int. Cl.².......................................... B23K 15/00
[58] Field of Search... 219/121 EB, 121 EM, 121 R, 219/121 LM, 121 L, 121 P, 137, 136

[56] References Cited
UNITED STATES PATENTS

| | | |
|---|---|---|
| 3,694,616 | 9/1972 | Brealey.......................... 219/121 EB |
| 3,725,635 | 4/1973 | Fink et al. ........................ 219/121 P |
| 3,780,412 | 12/1973 | Milland..................... 219/121 EB X |
| 3,824,368 | 7/1974 | Locke........................... 219/121 LM |
| 3,860,784 | 1/1975 | Brown et al. ................ 219/121 LM |

*Primary Examiner*—J. V. Truhe
*Assistant Examiner*—G. R. Peterson
*Attorney, Agent, or Firm*—Toren, McGeady and Stanger

[57] ABSTRACT

A hollow precision-machined body, such as a circular waveguide for transmission of millimeter wavelengths, is welded to a metallic body with minimum distortion of the precision body, by directing a concentrated beam of heat-producing energy such as an electron beam or a laser beam or a plasma across and peripherally about the interface between the precision and metallic bodies to produce a bead whose width at the contact area is related to the clearance between the bead and the inner surface of the precision tube and the maximum allowable strain at the inner face of the precision tube. Alternately, the energy beam is directed along the interface and around the periphery thereof to produce a bead whose depth of penetration is related to the thickness of the precision body and the maximum permissible strain at the inner surface of the precision body.

14 Claims, 19 Drawing Figures

METHOD FOR WELDING BETWEEN METALLIC BODY AND PRECISION TUBE BODY

BACKGROUND OF THE INVENTION

This invention relates to welding of precision-machined hollow bodies to other members, and particularly to welding tubular bodies of circular or rectangular or other cross sections, such as electronic waveguides, which have critical dimensions, to a coupling member such as a circular ring or fin or key and flange so that the precision bodies may ultimately be joined to each other.

For purposes of this application terms such as "precision tube bodies" or "tubular bodies" mean precision machined tubular bodies. The term "tubular" refers not only to bodies of circular cross section but also to rectangular and other cross sections. The bodies considered here are for use as waveguides, but may also be made for use in electronic machinery, tools, precision means and the like.

A circular waveguide generally transmits or propagates electromagnetic energy in the gigahertz band with wavelengths in the millimeter range. A circular waveguide has the disadvantage that small deformations or bending of the waveguide not only increase the attenuation and limit the signal being transmitted, but also easily change the transmitted wave from one mode to another. For this reason, circular waveguides must be manufactured to extreme accuracies within very low tolerances in the axial direction with respect to roundness, the longitudinal direction with respect to straightness, and with respect to smoothness at the inner face of the tube body. An extended conduit line of circular waveguides for long distance millimeter transmission can be formed by joining high precision tubular bodies having outside diameters of about 50 to 70 millimeters and wall thicknesses of about 2 to 5 millimeters. The mean radius of curvature of the tube axis along the inner face of the tube body is finished to within a degree for several hundred meters to several thousand meters and the roughness Hmax at the inner face of the tube is finished to a degree of several $\mu$. However, tube bodies must be joined without impairing the characteristics of the overall tube. Such tube bodies are joined by coupling them to each other. However, they must be coupled in such a way so that when the tube body and coupling are welded, the strain at the inner face of the tube body due to the welding must be kept less than several $10\mu$ at the most. Preferably it is desirable to keep the strain less than 10 to $15\mu$ to avoid deterioration of the tube body and hence the signal.

Generally, a tube is welded to a metallic body by means of electric arc welding, such as TIG welding, MIG welding, or the like. In these processes, an electric arc is produced between a wire and the metal to be welded so as to weld both of them. This produces a large amount of heat in the welding area. This results in a broad melted area. However, the thermal effect of the arc over a wide portion, and the strains imparted by contraction of the molten metal upon solidification cause large deformations at the inner face of the tube body. Moreover, the welds and their thermal effect may cause deterioration of any substances coating the interior of the tubes. Such deterioration impairs the characteristics of the tube body substantially and causes it to lose utility.

Mechanical joining of tube bodies, such as by screwing parts to each other, caulking, and the like, avoid the effect of welding heat. However, such mechanical arrangements require work of extremely high accuracy and raise the costs of a system. In joining long tubes with couplings, seizure or the like at the screw portion may occur and deteriorate the operating properties of the tube. Thus mechanical joining has proved to be unprofitable and undesirable industrially.

The force necessary for caulking may impair the characteristics of the tube body. Mechanical coupling generally requires sealing to prevent leakage where gases are enclosed within the tube body and to prevent invasion of gas from the outside of the tube body. Generally, sealing by packing produces a poor quality seal compared with welding, particularly where the sealed members must be used for a long time such as several decades.

It is an object of this invention to provide a method for welding, whereby in the joint between a tube body and a metallic body, by the welding bead, which has restricted any strain due to welding in a range not to impair the characteristics of the tube body, the capacity of locking and the capacity of sealing of the joint are obtained at the same time, thus solving the problems of known method all together.

As is publicly known, new techniques such as electron beam, plasma, laser and the like have been recently developed and generally utilize the characteristics of high energy density, high thermal efficiency, without the need of a welding rod or core wire and the like; they are applied as far as the field where usual methods for welding is not applicable. The electron beam, plasma, or laser beam, form a concentrated heat-producing beam of energy.

SUMMARY OF THE INVENTION

According to a feature of the invention, a precision tubular body is welded to a mechanical body by applying a concentrated beam of energy to form a bead which has a predetermined width and leaves a minimum distance between the bead and the inside surface of the precision tube, or has a minimum length for a particular thickness, on the basis of the maximum predetermined deformation of the inside of the tube body and in accordance with predetermined relationships.

These and other features of the invention are pointed out in the claims. Other objects and advantages of the invention will become evident from the following detailed description when read in light of the accompanying drawings.

BRIEF EXPLANATION OF THE DRAWINGS:

FIG. 13 (a), (b) are respectively side sectional views of a portion of a tube body and the front view thereof in case the tube body is welded with circular ring and fin by electron beam.

DESCRIPTION OF THE PREFERRED EMBODIMENTS:

This invention will be explained about an example, wherein a coupling among the metallic bodies to be welded on a tube body is welded on a waveguide for millimeter wave transmission.

The waveguide for millimeter wave transmission is a tube body forming a conduit line to transmit circular electric wave of which frequency being giga hertz band. The circular electric wave transmission has a weak point that it will easily change into another mode due to very small deformation or bending of waveguide to increase attemation as well as to give strain to the signal. For this reason, severe accuracy is required to the waveguide with respect to the properties of tube body, particularly to roundness, straightness and roughness of the inner face of tube body. The conduit line of this waveguide for millimeter wave transmission is formed by jointing high precision tube body having outside diameter of about 50 – 70 mm and wall thickness of about 2 – 5 mm, while mean radius of curvature of tube axis formed by the inner face of tube body is finished in a degree of several hundred meter to several thousand meter and roughness Hmax of the inner face of tube body is finished in a degree of several $\mu$, however, tube bodies must be jointed with each other without impairing the characteristics of said tube body. The tube bodies are jointed each other by way of coupling. So that, when the tube body and the coupling are jointed by welding, strain of the inner face of tube body due to welding must be kept less than several $10\mu$ at the most and it is desirable to keep said strain less than $10 - 15\mu$ to avoid perfectly the deterioration of the characteristics of tube body.

Therefore, in case a coupling is jointed to a precision tube body such as the waveguide for millimeter wave transmission by welding, it is necessary to adopt a welding method to keep the strain of inner face of tube body caused by welding less than $10 - 15\mu$. To attain such a purpose, this invention provides a method for welding of metallic body to a tube body by selecting the condition for welding bead according to the allowable strain of tube body by means of the electron beam welding having smaller welding strain compared with usual welding method such as an arc welding and the like.

In this invention, welding is effected by the electron beam welding method, and as shown in Table 1, both of plasma and laser having welding input density practically equal to the electron beam and having very high energy concentration characteristics, so that the electron beam welding method may be substituted for the welding method by plasma and laser.

Table 1

| Welding method | Input density w/cm$^2$ |
|---|---|
| arc | $10^4$ |
| plasma | $10^5 - 10^6$ |
| electron beam | $10^6 - 10^7$ |
| laser | $10^7 - 10^8$ |

This invention will be explained about an embodiment with reference to the drawings, as follows.

Figures 1, 2:
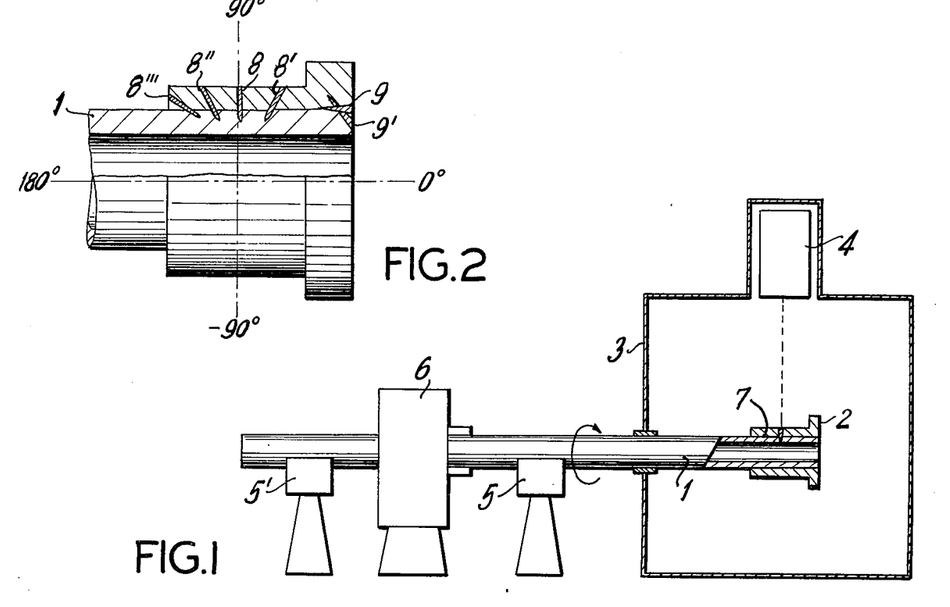
FIG. 1 and FIG. 3 are explanatory drawings, showing the working, wherein a flange is welded to a tube body by electron beam welding.
FIG. 2, FIG. 4 and FIG. 6 are L sections of welded portions.

FIG. 1 shows an apparatus for welding a coupling to a tube body by means of an electron beam. Here a tube body 1 and a coupling 2 are welded together by irradiation with an electron beam on a sealing portion 7. The process takes place within a vacuum box 3 under less than 1 Torr. The electron beam is generated within an electron gun 4 operating under high vacuum of less than $5 \times 10^{-4}$ Torr a rotating means 6 rotates the tube body 1 which carries the coupling 2 and is supporting devices 5 and 5'.

Figure 3:
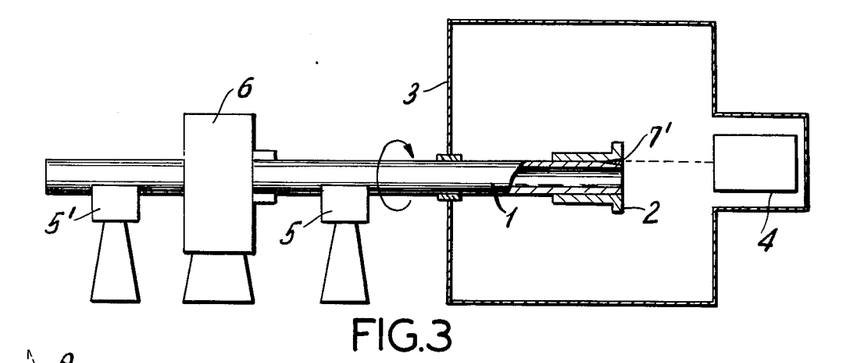
Figure 4:
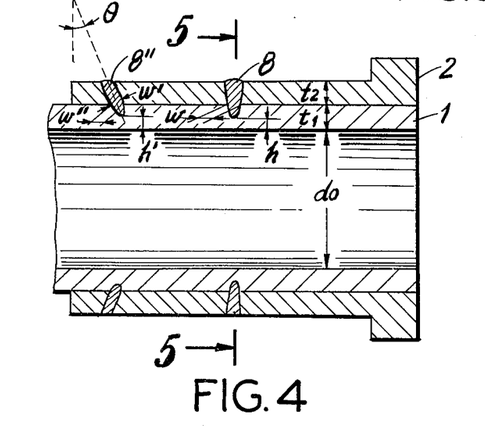
Figure 5:
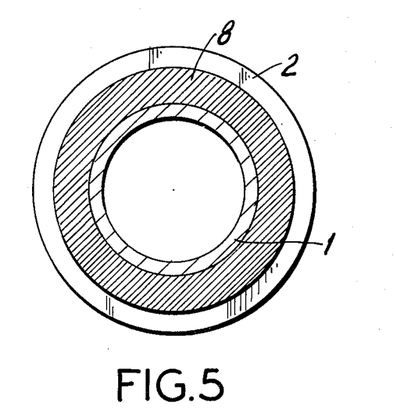
FIG. 5 and FIG. 7 are C sections of welding bead portions.

The angle of irradiation of the electron beam may be optionally selected to lie in a range from $-90°$ to $+180°$ relative to the axis of tube. As shown in FIG. 2, for instance, penetration 8 is irradiated at an angle of 90°, penetration 8' at 45° and penetration 9 at 0°. FIG. 1 illustrates an example of irradiation in the direction of 90° and FIG. 3 illustrates an example of irradiation in the direction of 0°. The penetration 8'' in FIG. 4, is formed when the angle of irradiation of electron beam is offset by $\theta$ from the vertical axis. As shown in FIG. 4, the relation between the effective bead width $w''$ on the sealing face and the penetration width $w'$ is $$w'' = w' / \cos\theta.$$

Thus $w''$ becomes larger than $w'$. Accordingly the required locking capacity may be obtained by small penetration. In this example, the tube body is rotated, while the electron gun is fixed. However the same result may be attained of course, by fixing the tube body and rotating the electron gun.

The magnitude of the deformation of the inner face due to the electron beam welding will depend upon the form and material of the coupling, molten width and molten depth of the penetration. Thus for the purpose of making the magnitude of deformation less than $10 - 15\mu$, it is important to determine these conditions, particularly width and depth of the penetration.

Figure 6:
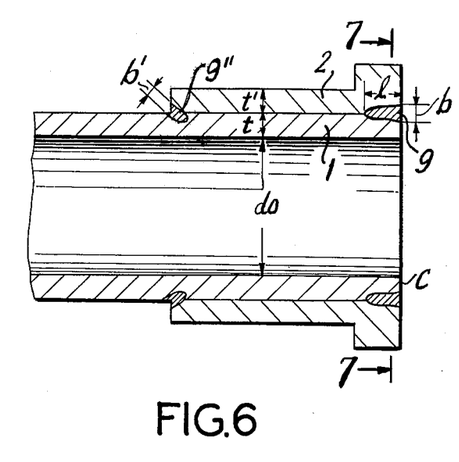
Figure 7:
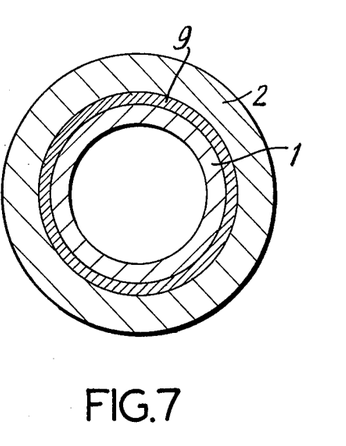

FIG. 4 and FIG. 6 illustrate enlarged views of beads produced by the welding operations in FIG. 1 and FIG. 3 respectively. FIG. 4, shows a section of a joint obtained by welding coupling 2 and tube body 1 with penetration 8 or 8'' which penetrate the coupling and continue peripherally about the tube body. The method which produces this bead is called method A. FIG. 6 shows a section of a joint obtained by another method for welding coupling 2 to tube body 1. Here a penetration 9'', in which the width $b'$ at the starting point of the penetration lies at the joint interface between coupling and tube body, penetrates along the joint interface between the coupling and the tube body. A penetration 9, in which the width $b$ at the starting point of the penetration lies at tube end $c$, forms a molten inlaid bead at the joint interface between the coupling and the tube body. The beads continue peripherally as shown in FIG. 7. The method producing these beads is known as method B.

The relation between the conditions for producing the electron beam and the strain created at the inner face of tube in methods A and B will be explained by way of an example. The quality of the material and shape of the tube body and the flange in this example are shown in Table 2.

Table 2

| Method | | Quality of material | Size (mm) | | |
|---|---|---|---|---|---|
| | | | do | t | t' |
| A | tube | [C] 0.13% Killed steel | 63.0 | 3.25 | |
| | flange | " | 63.0 | | 3.25 |
| B | tube | " | 63.0 | 2.00 3.25 4.50 | |
| | flange | " | 63.0 | | 3.25 |

Figure 8:
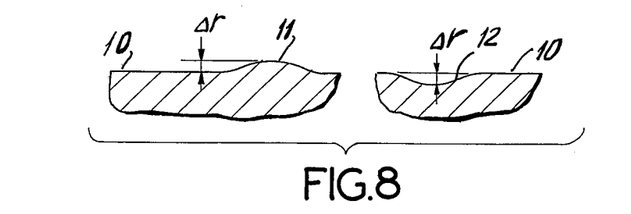
FIG. 8 is an explanatory drawing, showing the deformation of inner face of tube body near the welded portion.

In FIG. 8, the amount of strain at the inner face of the tube body is defined by the height of convex portion 11 from inner face 10 of the tube body or by $\Delta r$ which is the depth of the portion 12. When method A has been used, the strain at the inner face relates to the penetration width $w$ at the joint interface and the shortest distance $h$ between penetration and the inner face of tube body. When method B has been used, the strain relates to the molten depth $l$ of penetration and the distance between the jointed face and the inner face of tube body, i.e. the thickness $t$ of tube in the method B. The width $b$ at the starting point of penetration 9 is preferably 1 - 3 mm. It should be kept less than 5 mm.

Examples of results for the method A and the method B are respectively shown in Table 3 and Table 4.

Table 3

| Item Example | w (mm) | h (mm) | $\Delta r$ ($\mu$) |
|---|---|---|---|
| 1 | 0.33 | 1.0 | 8.4 |
| 2 | 0.49 | 1.6 | 10.1 |
| 3 | 0.54 | 0.5 | 20.5 |
| 4 | 0.99 | 3.0 | 11.1 |
| 5 | 0.99 | 2.1 | 19.6 |
| 6 | 1.03 | 1.1 | 31.0 |
| 7 | 1.46 | 3.1 | 21.1 |
| 8 | 2.02 | 3.1 | 29.3 |

Table 4

| Item Example | l (mm) | $t_1$ (mm) | $\Delta r$ ($\mu$) |
|---|---|---|---|
| 1 | 1.8 | 2.0 | 9.1 |
| 2 | 2.8 | 2.0 | 17.8 |
| 3 | 4.0 | 2.0 | 30.1 |
| 4 | 4.4 | 2.0 | 38.0 |
| 5 | 3.8 | 3.25 | 8.7 |
| 6 | 4.9 | 3.25 | 15.7 |
| 7 | 6.2 | 3.25 | 25.1 |
| 8 | 7.1 | 3.25 | 40.5 |
| 9 | 4.7 | 4.50 | 9.4 |
| 10 | 7.5 | 4.50 | 22.6 |

Figure 9:
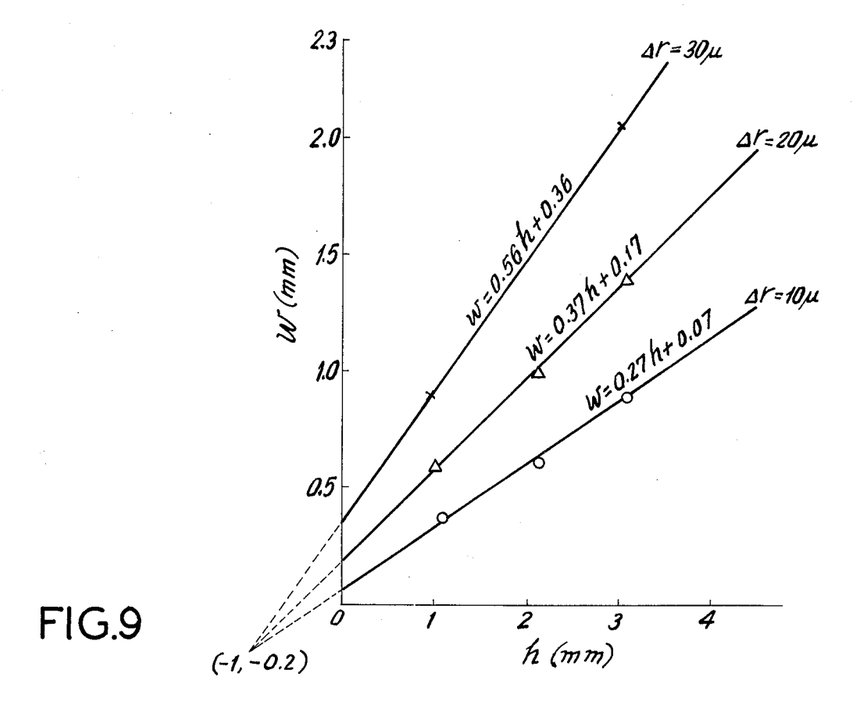
FIG. 9 is a diagram, showing the relations among width $w$ of bead at seam face, distance $h$ between the top of a bead and the inner face of a tube body, and strain $\Delta r$ of the inner face of a tube body.
Figure 10:
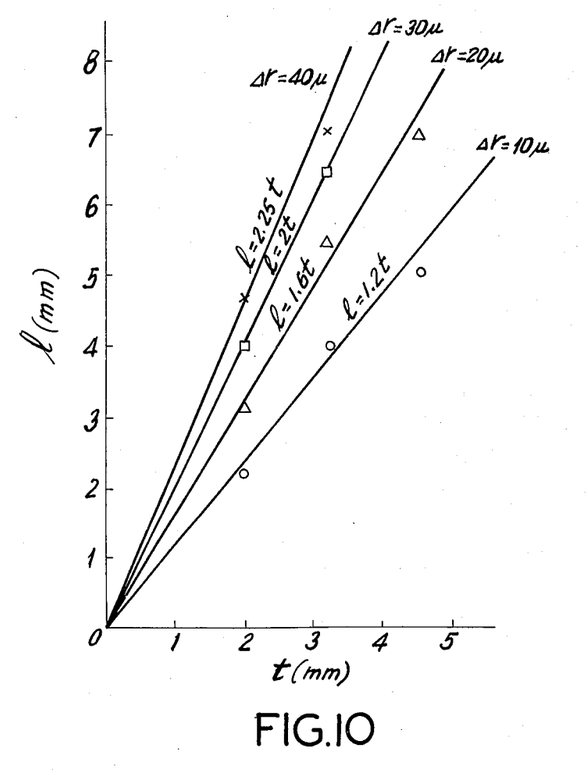
FIG. 10 is a diagram, showing the relation among molten bead length $l$, wall thickness $t$ and strain $\Delta r$ of the inner face of a tube body.

FIG. 9 illustrates the relationship of these results, with the method A. Here the data are arranged to take $w$ and $h$ as axes of rectangular coordinates for various values of the parameter $\Delta r$. With the method B, when the data are arranged to take $l$ and $t$ as axes of rectangular coordinates for various values of $\Delta r$ as parameter, FIG. 10 is obtained. Accordingly the condition for welding beads corresponding to the magnitude of the strain of the inner face of tube body is expressed as $$w + 0.2 = m(\Delta r) \times (h+1)$$

for the method A, and $$l = n(\Delta r)t$$

in the method B.

Figure 11:
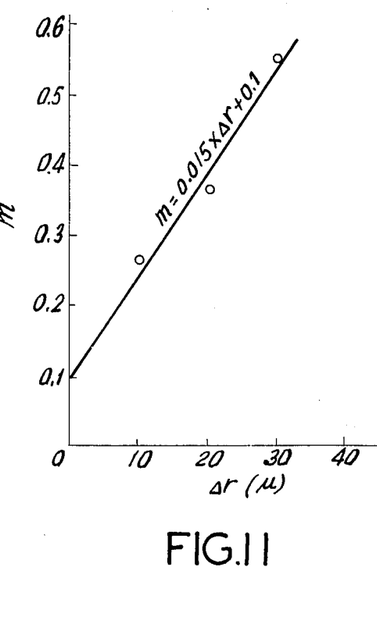
FIG. 11 and FIG. 12 are diagrams, showing the relation between inclination of the empirical formula and strain of the inner face of a tube body.
Figure 12:
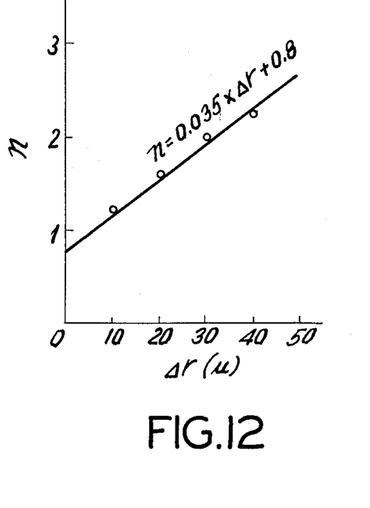

Here $m(\Delta r)$ : a constant function of $\Delta r$, and $n(\Delta r)$ : a constant function of $\Delta r$.
But, $m(\Delta r)$ and $n(\Delta r)$ are expressed as $$m(\Delta r) = 0.015 \times \Delta r + 0.1$$

and $$n(\Delta r) = 0.035 \times \Delta r + 0.8$$

as shown in FIG. 11 and FIG. 12.

In consequence, if the allowable magnitude of the strain at the inner face of tube body is assumed to be $\Delta r_a$ ($\mu$) the condition for welding the coupling to the tube body for $\Delta r = \Delta r_a$ is, $$0 < w \leq (0.015 \times \Delta r_a + 0.1) \times (h+1) - 0.2 \quad (1)$$

in the method A, and $$0 < l \leq (0.035 \times \Delta r_a + 0.8) \times t \quad (2)$$

in the method B.

For a waveguide for millimeter wave transmission the condition for penetration to weld the coupling to the tube body without impairing the characteristics of tube when $\Delta r_a = 15\mu$ is, $$0 < w \leq 0.35h + 0.15$$

in the method A, and $$0 < l \leq 1.325t$$

in the method B.

As a matter of course, in FIG. 9 the data on the line of $w = 0$ and $h = 0$ are not included, and the upper limit is given by the wall thickness of tube body. And, in FIG. 10 the data on the line of $l = 0$ are not included.

In this example, it is desirable that $h \leq 4$ mm and/or $t \leq 5$ mm. However if $h > 4$ mm and/or $t > 5$ mm, it is of course that the results may be obtained using similar ideas. Mechanical strength is another characteristic required for the coupling, and locking capacity (tensile strength) of the coupling at the welding portion is determined by the shear strength of the welding bead and the bead width at the interface in the method A, and by the shear strength and penetration depth at the interface in the method B. Thus these methods may be suitably selected within a range to satisfy the condition for welding beads corresponding to the necessary locking force of the coupling. The form of penetration may be freely controlled by a beam parameter, particularly by the beam output, energy density, welding velocity and the like. In the method A, when it is desired to reduce the strain of inner face by narrowing $w$, the necessary locking force of the coupling may be obtained by increasing the number of beads. One example of this invention has shown that for a penetration width 0.49 mm at the joint interface, the locking force is 3.70 ton (34.6 kg/mm²) for the method A. Also, for a penetration depth 4.0 mm at the joint interface, the locking force is 27.9 ton (32.0 kg/mm²) for the method B. Thus, when couplings welded on tube bodies are joined by welding of electron beam, MIG, TIG and the like, or by mechanical means such as bolt, nut and the like, it becomes possible to lay waveguide lines while making the best use of the characteristics of the tube body.

Further, as to material for the tube body and the coupling, similar results have been obtained as shown in this example with reference to [C] 0.08% capped steel and [C] 0.27% killed steel. In materials having larger gas component in steel than capped steel, stable penetration is difficult. Thus, for coupling it is desirable to select a metallic body having a smaller gas component than the material.

In these embodiments, the sectional form of the tube body is circular. However this invention is applicable to the welding of couplings for bodies having square sections and the like as well as for precision tube bodies of multilayer tube, multiple tube and the like.

Figure 13A:
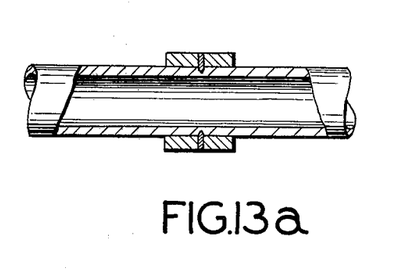
Figure 13B:
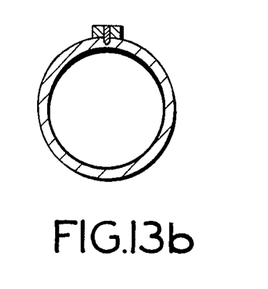

Also, when a metallic body such as the circular ring, shown in FIG. 13 or by a key, fin and the like are welded to the tube body, the same relation between the strain on the inner face of tube body and the condition of welding bead exists as in welding of a coupling. Thus the condition for the welding bead may be determined by the formula (1) or (2) according to the amount of allowable strain.

In the foregoing examples, the electron-beam welding was done by using a JEBW-7 electron-beam welding machine of 40 kw (100 KV, 400mA) manufactured by Nippon Denshi Co., Ltd. and the welding conditions are as follows.

Vacuum in the welding chamber: $1 \times 10^{-4}$ torr
Acceleration voltage: 100 KV
Welding speed: 1.75 $m$/min. The penetration was changed by varying the beam current and the lens current. Thus for example, in Table 3 (method A).
Example 1: beam current at 20mA, lens current at 1.19A
Example 5: beam current at 25mA, lens current at 1.33A
In other examples in Table 3, the beam current ranged from 20 to 30 mA and the lens current ranged from 1.19 to 1.35A, and in Table 4 (B method).
Example 1: beam current at 8mA, lens current 1.19A
Example 6: beam current at 17mA, lens current at 1.19A In other examples in Table 4, the beam current ranged from 8 to 32mA and the lens current ranged from 0.8 to 1.20A. The distance was 100mm and the focal position was on the surface.

The following examples show the joints of precision tubes welded according to the present invention.

Figure 14:
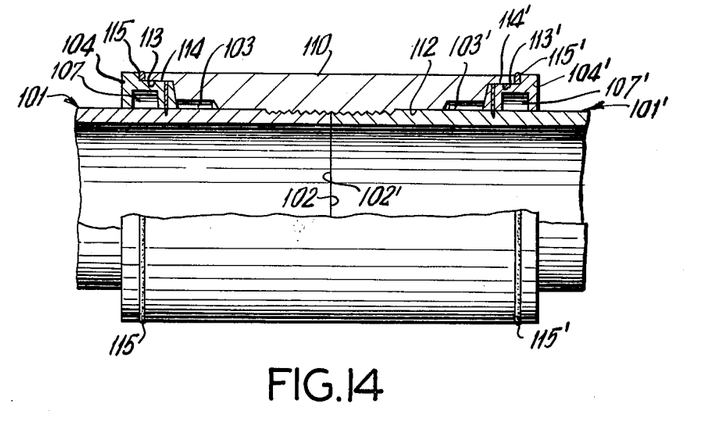
FIGS. 14 to 18 show respectively an example of a joint portion of a precision tube welded according to the present invention.

EXAMPLE 1:

In FIG. 14, a thick-walled projections 104, 104' are welded by electron-beam welding according to the present invention around the outer circumferences 103, 103' of precision tubes 101, 101' at a required distance from the joint ends 102, 102' of the precision tubes to be joined. The end portions of the precision tubes are screwed into a joint metal sleeve 110 from both sides so as to abut the end faces 102, 102' of the precision tubes coaxially. The inner circumferential faces 113, 113' at the end portions of the sleeve are engaged with and welded to the outer circumferential surfaces 114, 114 of the projections, by another welding method to form welding bands 115, 115'. By the provision of the recessions 107, 107' in the projections 104, 104', heat effect on the precision tube by the welding can be reduced.

Figure 15:
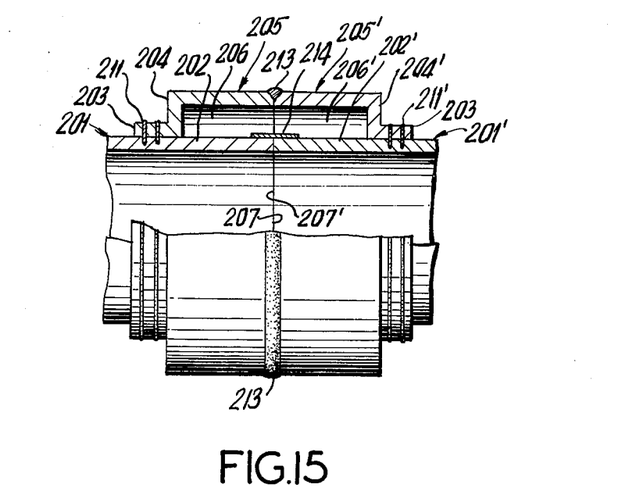

EXAMPLE 2:

In FIG. 15, joint metal flanges 205, 205' composed of cylindrical engaging portions 203, 203' and projections 204, 204' are mounted around end portions 202, 202' of precision tubes 201, 201', so as to provide spaces 206, 206' around the end portions 202, 202'. The end portions 202, 202' and the cylindrical engaging portions 203, 203' are welded by electron-beam welding at 211, 211' according to the present invention. The end faces 207, 207' are abutted coaxially and welded together from outside by another welding method to form a welding band 213. The member 214 prevents bending of the precision tubes 201, 201' misalignment of the end faces 207, 207'.

Figure 16:
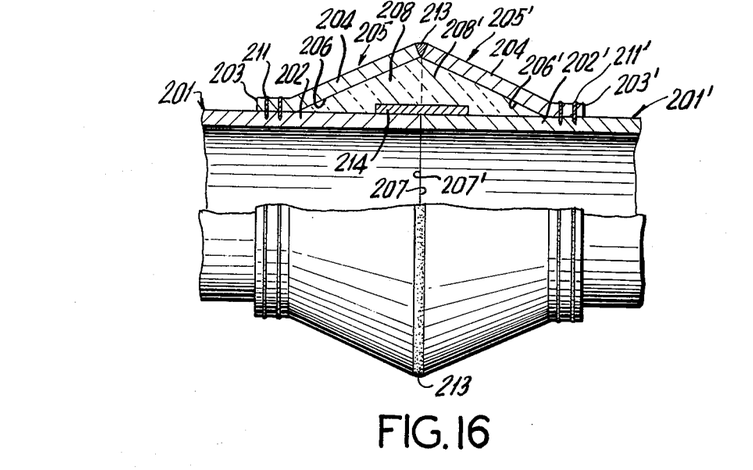

In FIG. 16, the joint metal flanges 205, 205' shown in FIG. 15 are formed in a trumpet-like form, and a heat-absorbing member, a cooling member or an insulating member etc. 208, 208' are provided in the spaces 206, 206'.

Figure 17:
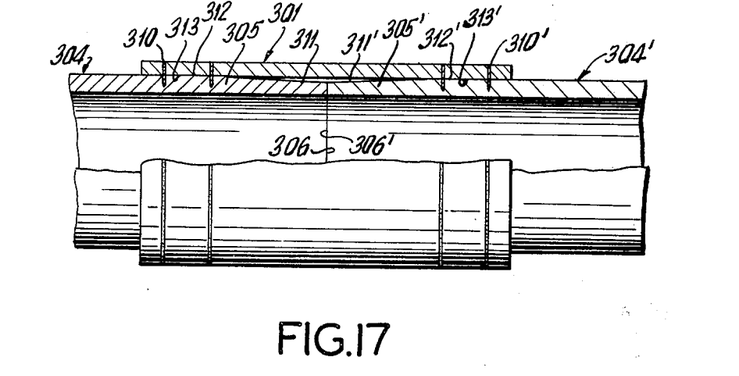

EXAMPLE 3:

In FIG. 17, the end portions 305, 305' of precision tubes 304, 304' to be jointed are inserted air-tightly into the joint metal sleeve 301 from both sides. The end faces 306, 306' are put together i.e. abutted so as to align the precision tubes coaxially. The end portioins 305, 305' of the precision tubes are tapered toward the end faces 306, 306' so as to form tapered circumferential walls 311, 311', and the sleeve 301 and the precision tubes 304, 304' are welded by electronbeam welding according to the present invention at 310, 310'.

Figure 18:
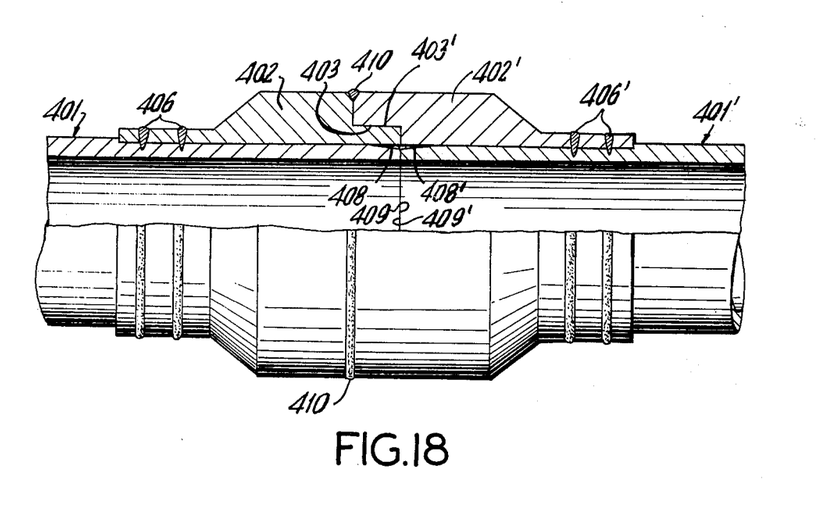

EXAMPLE 4:

In FIG. 18, precision tubes 401, 401' to be jointed are inserted into joints 402, 402' having male and female engaging faces 403, 403'. End faces 409, 409' of the precision tubes are put together i.e. abutted so as to connect the precision tubes 401, 401' coaxially. The joints 402, 402' are welded to the precision tubes 401, 401' by electron-beam welding according to the present invention at 408, 408', and 406, 406', and the joints 402, 402' are welded by another welding method to form a welding band 410.

What is claimed is:
1. A method for welding a metallic body to a precision tube body having an inner face with an allowable strain $\Delta r_a$ ($\mu$), comprising directing a beam of concentrated energy through the metallic body and across an interface between the metallic body and the tubular body and rotating the beam and bodies relative to each other so as to form a bead peripherally about the precision body, penetrating with the bead so that the beam width W at the interface and the distance $h$ between the bead and the inside surface of the precision tube are defined by

$$o < W \leq (0.015 \times \Delta r_a + 0.1)(h + 1) - 0.2$$

2. The method as in claim 1, wherein the step of directing a concentrated energy beam constitutes directing an electron beam.
3. The method as in claim 1, wherein the concentrated beam is a laser beam.
4. The method as in claim 1, wherein the concentrated beam is a plasma.
5. A method for welding a metallic body to a precision tubular body along an interface with the tubular body having an inner face with an allowable strain $\Delta r_a$ ($\mu$), comprising directing a concentrated beam of energy sufficient to melt both the metallic body and the tubular body along the interface so as to form a bead, moving the bodies and the beam relative to each other so as to continue the bead peripherally along the interface, and applying the beam so that the width $b$ of the starting point of penetration lies at the interface and the depth $l$(mm) of penetration at the interface are related to the thickness of the tubular body in accordance with the relationship $$o < l \leq (9{,}935 \times \Delta r_a + 0.8) t$$

6. The method as in claim 5, wherein the step of directing a concentrated energy beam constitutes directing an electron beam.

7. The method as in claim 5, wherein the concentrated beam is a laser beam.

8. The method as in claim 5, wherein the concentrated beam is a plasma.

9. The method as in claim 5, wherein the width of the starting point of penetration lies at the end of the tubular body.

10. The method as in claim 9, wherein the step of directing a concentrated energy beam constitutes directing an electron beam.

11. The method as in claim 9, wherein the concentrated beam is a laser beam.

12. The method as in claim 9, wherein the concentrated beam is a plasma.

13. A product, comprising a hollow precision member having a precision machined inner face with an allowable strain $\Delta r_a$ ($\mu$), a coupling member connected to the outside of the hollow member along an interface, a welding bead welding the coupling member to the hollow member and extending peripherally along the interface between the two members, said bead having a bead width W in millimeters along the interface and a minimum distance $h$ between the bead and the inside surface of the hollow tube, wherein $$o < W \leq (0.015 \times \Delta r_a = 0.1)(h - 1) - 0.2$$

14. A product, comprising a hollow precision-machined body having an inner face with an allowable strain of $\Delta r_a$ ($\mu$), a member mounted about the body along an interface, a welding bead joining the member and the body along the interface and extending along the interface as well as peripherally about the body, said bead penetrating the interface to a depth $l$(mm), said tube body having a thickness $t$ in millimeters, wherein:

$$o < l \leq (9{,}935 \times \Delta r_a + 0.8) t$$

* * * * *